(12) United States Patent
Soisson et al.

(10) Patent No.: US 8,242,236 B2
(45) Date of Patent: Aug. 14, 2012

(54) ELASTOMERIC NANOCOMPOSITE MANUFACTURING

(75) Inventors: John P. Soisson, Houston, TX (US); Yuan-Ju (Ray) Chen, Houston, TX (US); Weiqing Weng, Houston, TX (US); Michael Brendan Rodgers, Seabrook, TX (US); Robert N. Webb, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 136 days.

(21) Appl. No.: 12/788,164

(22) Filed: May 26, 2010

(65) Prior Publication Data

US 2011/0294939 A1    Dec. 1, 2011

(51) Int. Cl.
*B60C 1/00* (2006.01)
*B82Y 30/00* (2011.01)
*C08J 3/21* (2006.01)

(52) U.S. Cl. ............... 528/490; 524/447; 428/411.1

(58) Field of Classification Search .............. 524/447; 528/490; 428/411.1
See application file for complete search history.

(56) References Cited

U.S. PATENT DOCUMENTS

| | | | |
|---|---|---|---|
| 5,670,582 A | 9/1997 | Chung et al. | |
| 6,057,396 A | 5/2000 | Lan et al. | |
| 6,521,690 B1 | 2/2003 | Ross et al. | |
| 6,586,500 B2 | 7/2003 | Bagrodia et al. | |
| 6,828,370 B2 | 12/2004 | Lan et al. | |
| 7,022,299 B2 | 4/2006 | Lin et al. | |
| 7,125,916 B2 | 10/2006 | Lin et al. | |
| 7,442,728 B2 | 10/2008 | Lin et al. | |
| 2007/0197711 A1 | 8/2007 | Ijdo et al. | |
| 2011/0250372 A1* | 10/2011 | Weng et al. | 428/36.6 |

FOREIGN PATENT DOCUMENTS

| | | |
|---|---|---|
| DE | 10 2005 044 529 | 3/2007 |
| WO | 2007/109877 | 10/2007 |
| WO | 2008/068543 | 6/2008 |
| WO | 2010/044776 | 4/2010 |

OTHER PUBLICATIONS

*Butyl Rubber*, Encyclopedia of chemical Technology, Copyright John Wiley & Sons, Inc., vol. 4, pp. 433-458.

* cited by examiner

*Primary Examiner* — Kelechi Egwim
(74) *Attorney, Agent, or Firm* — Nancy T. Krawczyk

(57) ABSTRACT

An elastomeric nanocomposite is produced from an isobutylene-based polymer and a layered nanofiller. The process of preparing the nanocomposite includes the steps of a) polymerizing isobutylene monomers and multiolefin monomers to produce an isobutylene-based polymer; b) completing at least one mass transfer dependent stage in the process wherein, after completion of the stage and prior to any recovery of the polymer, the polymer is dissolved in a solvent to create a polymer cement; c) contacting the layered nanofiller and the polymer solvent to obtain the nanocomposite; and d) recovering the nanocomposite. The layered nanofiller may be in a slurry prior to contacting with the polymer cement.

19 Claims, 3 Drawing Sheets

100
ELASTOMERIC NANOCOMPOSITE MANUFACTURING

FIELD OF INVENTION

The present invention is directed to a method of preparing nanocomposites. More particularly, the present invention is directed to a method of preparing elastomeric nanocomposites during the polymer manufacturing process.

DESCRIPTION OF RELATED ART

Rubbery polymers containing a majority of isobutylene units are well known for their low gas permeability, unique damping properties, and low surface energy; these properties make such copolymers particularly desired in applications such as tire innerliners. In order to have a better compatibility or co-curability with other elastomer components in the end applications, at least one unsaturated comonomer and/or comonomer containing reactive functionality is introduced into the isobutylene rubbery polymer. Previously known comonomers include isoprene and styrene. The polymer may be partially brominated to give better compatibility.

The tire industry has always been interested in enhancing the barrier properties of tires. One way to improve the barrier properties is to mix them with layered filler to form an elastomeric nanocomposite. The layered filler can adapt to five different states in the base polymer.

The first state is "particle dispersion" wherein the filler particle size is in the order of microns but uniformly dispersed in the base polymer. The terms aggregate and agglomerate have been used to describe this state.

The second state is an "intercalated nanocomposite" wherein polymer chains are inserted into the layered filler structure, this occurring in a crystallographic regular fashion, regardless of the polymer to filler ratio. Intercalated nanocomposites may typically contain several layers of polymer between organofiller plates. An increase in the gallery spacing of the nanofiller, swollen with rubber, from a pristine state of about 0.3 to 0.7 nm up to about 2.0 to 6.0 nm can be considered as creating an intercalated condition.

The third state is a "flocculated nanocomposite." This is conceptually the same as intercalated nanocomposites; however, the individual filler layers are sometimes flocculated or aggregated due to hydroxylated edge to edge interactions of the filler layers.

The fourth state is an "intercalated-flocculated nanocomposite." The filler plates in the nanocomposite can be separated; however, tactoids or agglomerates can form that have a thickness in the range of 100 to 500 nm.

The fifth state is an "exfoliated nanocomposite." In an exfoliated nanocomposite, the individual filler layers are separated within a continuous polymer by an average distance that depends on the filler concentration or loading in the polymer.

However, in producing an elastomeric nanocomposite, the incompatibility between the hydrophobic polyolefin elastomer and the hydrophilic inorganic filler can make it very difficult to achieve a good dispersion or exfoliation within the elastomer. Much effort has been make to modify the filler or the elastomer to make the two elements more compatible. It has been previously shown that better interaction between the functionality on the polymer and filler layer surface would lead to a higher degree of dispersion and exfoliation. This, in turn, will yield elastomeric nanocomposites with enhanced barrier properties.

SUMMARY OF INVENTION

The present invention is directed to a method of preparing nanocomposites. In the invention, the disclosed preparation method yields a greater compatibility between the hydrophobic elastomer and hydrophilic filler. By having an increased compatibility of the elastomer and filler, if there is any compression or future mixing/agitation of the nanocomposite, the exfoliated clay is less inclined to reagglomerate, which would negatively affect the desired low permeability characteristics of the nanocomposite.

Disclosed herein is a method for producing the elastomeric nanocomposite wherein the nanocomposite is formed from an isobutylene-based polymer and a layered nanofiller. The process includes the steps of a) polymerizing isobutylene monomers and multiolefin monomers to produce an isobutylene-based polymer; b) completing at least one mass transfer dependent stage in the process wherein, after completion of the at least one stage and prior to any recovery of the polymer, the polymer is dissolved in a solvent; c) contacting the layered nanofiller and the polymer solvent to obtain the nanocomposite; and d) recovering the nanocomposite. The at least one mass transfer stage that is completed may be the polymerization of the monomers that produces the polymer.

In one aspect of the invention, the completed mass transfer dependent stage can be: i) the polymerization of the isobutylene monomers and multiolefin monomers; ii) functionalized of the isobutylene-based polymer in a solvent; or iii) neutralization of the functionalized isobutylene-based polymer solvent. In producing the elastomeric nanocomposite, any one or more or all of these steps may be completed. When the only stage completed prior to contact with the nanofiller is the polymerization, polymerization of the monomers may take place in a solvent so that the polymer is already dissolved in a solvent and contact with the nanofiller occurs without removal of the polymer from the solvent. In another embodiment, at least stages i) and ii) are completed prior to contacting the nanofiller slurry and the polymer solvent.

In one disclosed aspect of the invention, the isobutylene-based polymer is polymerized from $C_4$ to $C_{14}$ multiolefins. The multiolefin monomer may be at least one of isoprene, butadiene, 2,3-dimethyl-1,3-butadiene, myrcene, 6,6-dimethyl-fulvene, hexadiene, cyclopentadiene, alkylstyrene, or piperylene.

In another disclosed aspect of the invention, the isobutylene based polymer is butyl rubber, bromobutyl rubber, chlorobutyl rubber, brominated isobutylene-methyl-styrene rubber, chlorinated isobutylene-methyl-styrene rubber, star branched butyl rubber, star branched chlorobutyl rubber, star branched bromobutyl rubber, isoprene-isobutylene-methyl-styrene rubber, or isobutylene-cyclopentadiene-methyl-sytrene rubber.

In another disclosed method, the layered nanofiller is smectite or phyllosilicate clay. Alternatively, the layered nanofiller is montmorillonite, beidellite, nontronite, saponite, hectorite, sauconite, montmorillonite, nontronite, beidellite, bentonite, volkonskoite, laponite, hectorite, saponite, sauconite, magadite, kenyaite, stevensite, vermiculite, halloysite, aluminate oxides, or hydrotalcite.

Also disclosed is that in any embodiment, the layered nanofiller has been treated with a modifying agent prior to contacting with the polymer solvent.

In another disclosed aspect applicable to any disclosed embodiments, prior to contacting the layered nanofiller with the polymer solvent, the layered nanofiller is mixed in a solvent to create a filler slurry.

In another disclosed aspect of the invention, the nanofiller and the polymer are contacted under conditions of high shear mixing or static mixing.

In another aspect of the invention applicable to any disclosed embodiments, an emulsifier may be added during the contacting step.

In another disclosed aspect, the elastomeric nanocomposite is recovered using at least one of the following steps removal of the solvent, washing the nanocomposite, drying the nanocomposite, and baling the nanocomposite.

BRIEF DESCRIPTION OF THE DRAWINGS

The invention will be described by way of example and with reference to the accompanying drawings in which.

DETAILED DESCRIPTION OF THE INVENTION

Figure 1:
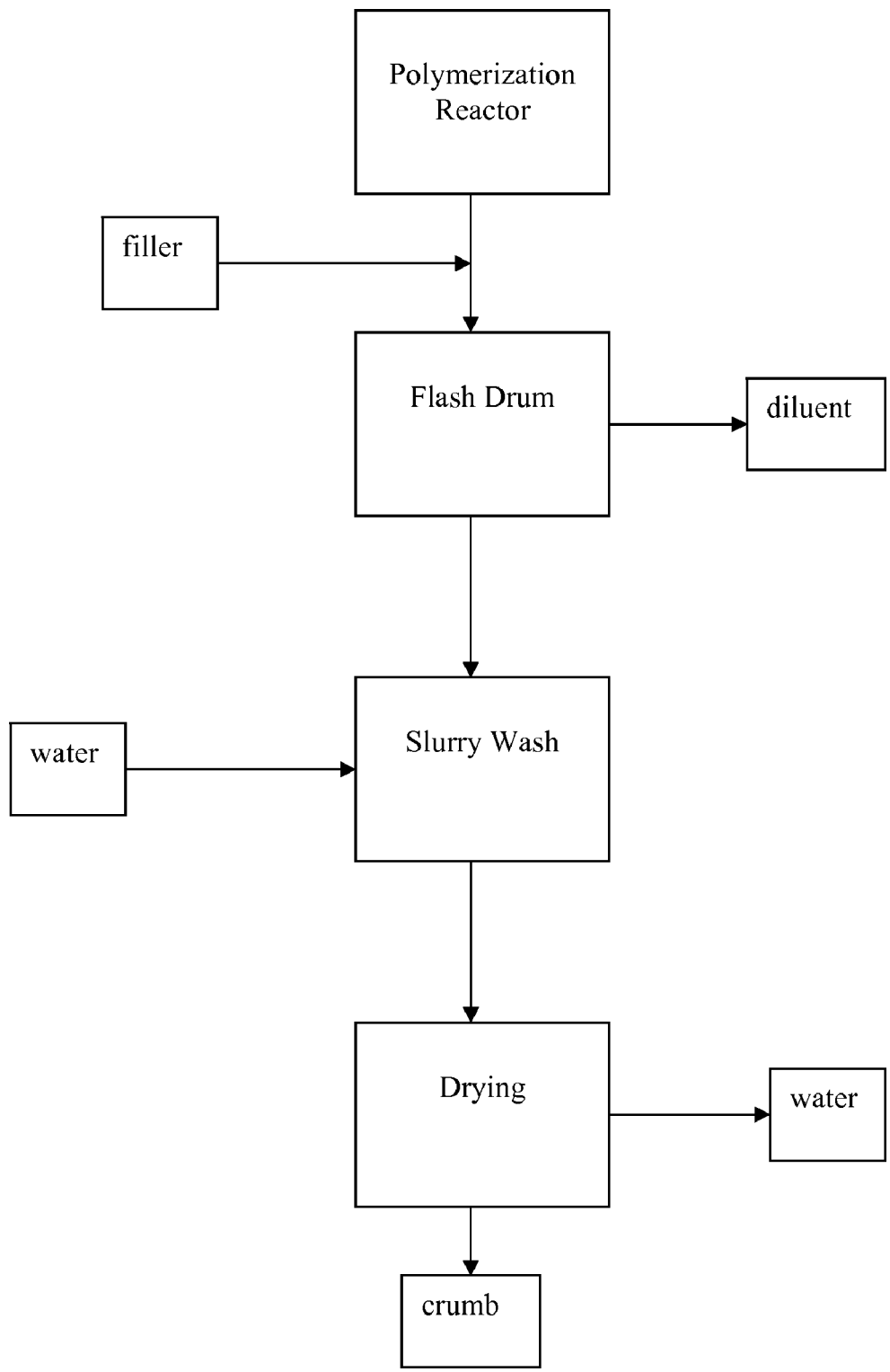
FIG. 1 is a diagram for manufacturing a nanocomposite polymer based upon solution polymerization for the base polymer.

Various specific embodiments, versions, and examples of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

Definitions

Definitions applicable to the presently described invention are as described below.

Rubber refers to any polymer or composition of polymers consistent with the ASTM D1566 definition: "a material that is capable of recovering from large deformations, and can be, or already is, modified to a state in which it is essentially insoluble (but can swell) in boiling solvent . . . ." Elastomer is a term that may be used interchangeably with the term rubber. Elastomeric composition refers to any composition comprising at least one elastomer as defined above.

A vulcanized rubber compound by ASTM D1566 definition refers to "a crosslinked elastic material compounded from an elastomer, susceptible to large deformations by a small force capable of rapid, forceful recovery to approximately its original dimensions and shape upon removal of the deforming force'. A cured elastomeric composition refers to any elastomeric composition that has undergone a curing process and/or comprises or is produced using an effective amount of a curative or cure package, and is a term used interchangeably with the term vulcanized rubber compound.

The term "phr" is parts per hundred rubber or "parts," and is a measure common in the art wherein components of a composition are measured relative to a total of all of the elastomer components. The total phr or parts for all rubber components, whether one, two, three, or more different rubber components is present in a given recipe is always defined as 100 phr. All other non-rubber components are ratioed against the 100 parts of rubber and are expressed in phr. This way one can easily compare, for example, the levels of curatives or filler loadings, etc., between different compositions based on the same relative proportion of rubber without the need to recalculate percents for every component after adjusting levels of only one, or more, component(s).

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

Substituted refers to at least one hydrogen group being replaced by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, isopropyl, normal butyl, isobutyl, secondary butyl, tertiary butyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4-dichlorobutyl, 4,4-dibromobutyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

Elastomers

Preferred elastomers useful in the practice of this invention include a) polymers derived from at least one $C_4$ to $C_7$ isoolefin monomer and at least one multiolefin monomer and b) homopolymers of $C_4$ to $C_7$ isoolefin monomers. Some such copolymers are conventionally referred to as "butyl rubbers." For the copolymers, the isoolefin derived content in the copolymer is in a range from 70 to 99.5 wt % by weight of the total monomer derived units in one embodiment, and 85 to 99.5 wt % in another embodiment. The total multiolefin derived content in the copolymer is present in the range of mixture from 30 to 0.5 wt % in one embodiment, and from 15 to 0.5 wt % in another embodiment. In yet another embodiment, from 12 to 0.5 wt % of the polymer is multiolefin derived units. In yet another embodiment, from 8 to 0.5 wt % of the polymer is multiolefin derived units. Herein for the purpose of this invention, multiolefin refers to any monomer having two or more double bonds. In a preferred embodiment, the multiolefin is any monomer comprising two conjugated double bonds and may be an aliphatic or aromatic monomer.

The $C_4$ to $C_7$ isoolefin may selected from compounds such as isobutylene, isobutene, 2-methyl-1-butene, 3-methyl-1- butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, alkylstyrene, and piperylene, and other monomers such as disclosed in U.S. Pat. No. 5,506,316.

When the isoolefin is isobutylene, the elastomers may be referred to as "an isobutylene based elastomer" and refers to an elastomer or a polymer comprising at least 70 mol % isobutylene derived units. One embodiment of the isobutylene based butyl rubber polymer useful in the invention is obtained by reacting 92 to 99.5 wt % of isobutylene with 0.5 to 8 wt % isoprene, or 95 to 99.5 wt % isobutylene with 0.5 wt % to 5 wt % isoprene in yet another embodiment.

The elastomer in a desirable embodiment of the invention is halogenated. Halogenated butyl rubber is produced by the halogenation of any of the butyl polymers described above. Halogenation can be carried out by any means, and the invention is not herein limited by the halogenation process. The halogen wt % is from 0.1 to 10 wt % based on the weight of the halogenated butyl rubber in one embodiment, and from 0.5 to 5 wt % in another embodiment. In yet another embodiment, the halogen wt % of the halogenated butyl rubber is from 1.0 to 2.5 wt %.

In accordance with another embodiment of the present invention, the elastomer is a random copolymer comprising a $C_4$ to $C_7$ isoolefins derived units and alkylstyrene derived units, the copolymer containing at least 85%, alternatively at least 86.5% by weight of the isoolefin units, about 8 to about 12% by weight alkylstyrene units, and about 1.1 to about 1.5 wt % of a halogen. In one embodiment, the polymer may be a random elastomeric copolymer of a $C_4$ to $C_7$ α-olefin and a methylstyrene containing at about 8 to about 12% by weight methylstyrene, and 1.1 to 1.5 wt % bromine or chlorine. Exemplary materials may be characterized as polymers containing the following monomer units randomly spaced along the polymer chain:

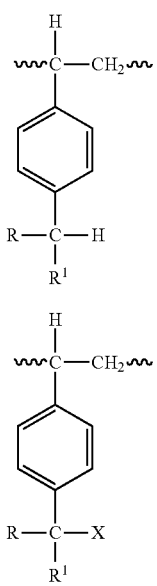

wherein R and $R^1$ are independently hydrogen, lower alkyl, such as a $C_1$ to $C_7$ alkyl and primary or secondary alkyl halides and X is a halogen. In one embodiment, R and $R^1$ are each hydrogen.

Up to 25 mol % of the total alkyl substituted styrene [the total of structures (1) and (2)] present in the random polymer structure may be the halogenated alkyl substituted structure (2) above in one embodiment, and in another embodiment from 10 to 25 mol %. In yet another embodiment, the amount of functionalized structure (2) in the random copolymer itself is from about 0.8 to about 1.10 mol %.

In one embodiment, the elastomer comprises random polymers of isobutylene and para-methylstyrene (PMS) containing from about 5 to about 10 mol % para-methylstyrene wherein up to 25 mol % of the methyl substituent groups present on the benzyl ring contain a bromine or chlorine atom, such as a bromine atom (para-(bromomethylstyrene)), as well as acid or ester functionalized versions thereof.

In another embodiment, the functionality is selected such that it can react or form polar bonds with functional groups present in the matrix polymer, for example, acid, amino or hydroxyl functional groups, when the polymer components are mixed at high temperatures.

In certain embodiments, the random copolymers have a substantially homogeneous compositional distribution such that at least 95% by weight of the polymer has a para-alkylstyrene content within 10% of the average para-alkylstyrene content of the polymer. Exemplary polymers are characterized by a narrow molecular weight distribution (Mw/Mn) of less than 4.0, alternatively less than 2.5. The copolymers have an exemplary viscosity average molecular weight in the range of from 400,000 up to 2,000,000 and an exemplary number average molecular weight in the range of from 100,000 to 750,000 as determined by gel permeation chromatography.

The random copolymer discussed above may be prepared via slurry polymerization, typically in a diluent comprising a halogenated hydrocarbon(s) such as a chlorinated hydrocarbon and/or a fluorinated hydrocarbon (see U.S. Pat. No. 7,232,872), using a Lewis acid catalyst and optionally a catalyst initiator, followed by halogenation, preferably bromination, in solution in the presence of the halogen and a radical initiator such as heat and/or light and/or a chemical initiator and, optionally, followed by electrophilic substitution of the halogen with a different functional moiety.

Halogenated poly(isobutylene-co-p-methylstyrene) polymers generally contain from about 0.8 to about 1.1 mol % of halo-methylstyrene groups relative to the total amount of monomer derived units in the copolymer. In another embodiment, the amount of halo-methylstyrene groups is from 0.80 to 1.10 mol %, and from 0.80 to 1.00 mol % in yet another embodiment, and from 0.85 to 1.1 mol % in yet another embodiment, and from 0.85 to 1.0 in yet another embodiment, wherein a desirable range may be any combination of any upper limit with any lower limit. Expressed another way, the copolymers of the present invention contain from about 1.1 to about 1.5 wt % of halogen, based on the weight of the polymer, from 1.1 to 1.5 wt % halogen in another embodiment, and from 1.15 to 1.45 wt % in another embodiment. In a preferred embodiment, the halogen is either bromine or chlorine; in a most preferred embodiment, the halogen is bromine.

The polymers are substantially free of ring halogen or halogen in the polymer backbone chain. In one embodiment, the random polymer is a copolymer of $C_4$ to $C_7$ isoolefin derived units (or isomonoolefin), para-methylstyrene derived units and para-(halomethylstyrene) derived units, wherein the para-(halomethylstyrene) units are present in the polymer from about 10 to about 25 mol % based on the total number of para-methylstyrene, and wherein the para-methylstyrene derived units are present from 8 to 12 wt % based on the total weight of the polymer in one embodiment, and from 9 to 10.5 wt % in another embodiment. In another embodiment, the para-(halomethylstyrene) is para-(bromomethylstyrene).

Other $C_4$ to $C_7$ isoolefin derived unit containing elastomers suitable for use in the present invention include terpolymers comprising the isoolefin and two multiolefins wherein the multiolefins have different backbone structures prior to polymerization. Such terpolymers include both block and random terpolymers of $C_4$ to $C_8$ isoolefin derived units, $C_4$ to $C_{14}$ multiolefin derived units, and alkylstyrene derived units. Such terpolymers may be formed from isobutylene, isoprene, and alkylstyrene, preferably methylstyrene, monomers. Another suitable terpolymer may be polymerized from isobutylene, cyclopentadiene, and alkylstyrene monomers. Such terpolymers are obtained under cationic polymerization conditions.

Layered Filler

To form the desired elastomeric nanocomposite, a layered filler is incorporated into the elastomeric polymer. The layered filler is alternatively referred to as a nanofiller due to the size of the clays. Nanofillers have a maximum dimension in the range of from about 1.0 nanometers ($1.0 \times 10^{-9}$ m) to about 100 microns ($1.0 \times 10^{-4}$ m). The other characteristic of a nanofiller is the high ratio of surface area to volume; this is in distinction to a fine grain carbon black that might have a very small maximum dimension but which has a low ratio of surface area to volume per grain. This high ratio of surface area to volume provides the nanofiller with a sheet-like structure. Such materials are typically agglomerated, resulting in the layered filler.

In one embodiment, the layered clay is in general class of clay minerals with expanding crystal lattices commonly referred to as a "smectite" or "smectite-type clay." By way of example, this may include the dioctahedral smectites which consist of montmorillonite, beidellite, and nontronite, and the trioctahedral smectites, which includes saponite, hectorite, and sauconite. Also encompassed are synthetically prepared smectite-clays.

In yet other embodiments, the layered clay may comprise natural or synthetic phyllosilicates, such as montmorillonite, nontronite, beidellite, bentonite, volkonskoite, laponite, hectorite, saponite, sauconite, magadite, kenyaite, stevensite and the like, as well as vermiculite, halloysite, aluminate oxides, hydrotalcite, and the like. Combinations of any of the previous embodiments are also contemplated.

The layered clays described above are modified by intercalation or exfoliation by at least one agent, modifier, or surfactant capable of undergoing ion exchange reactions with the anions present at the interlayer surfaces of the layered filler to render the clay more hydrophobic. The agents, modifiers, or surfactants are selected for their capability of undergoing ion exchange reactions with the anions present at the interlayer surfaces of the layered filler. Suitable compounds are cationic surfactants, preferably amines. The amines may be secondary or tertiary amines having the structure $N^+(R^1R^2R^3)$ wherein $R^1$ and $R^2$ are the same or different and are independently selected from $C_1$ to $C_{26}$ alkyls, $C_2$ to $C_{26}$ alkenes, and $C_3$ to $C_{26}$ aryls and $R^3$ may be hydrogen, a $C_1$ to $C_{26}$ alkyl, a $C_2$ to $C_{26}$ alkene, or a $C_3$ to $C_{26}$ aryl. In one embodiment, $R^1$ and $R^2$ are independently selected from $C_1$ to $C_8$ alkyls, $C_2$ to $C_8$ alkenes, and $C_3$ to $C_8$ aryls, and $R^3$ is selected from hydrogen, $C_9$ to $C_{26}$ alkyls, $C_9$ to $C_{26}$ alkenes, and $C_9$ to $C_{26}$ aryls. In another embodiment, $R^1$ and $R^2$ are independently selected from $C_1$ to $C_8$ alkyls, and $C_2$ to $C_8$ alkenes, $R^3$ is selected from hydrogen, $C_3$ to $C_{26}$ aryl substitution on a $C_1$ to $C_{26}$ alkyl. In another embodiment, $R^1$ is selected from $C_1$ to $C_8$ alkyls, $C_2$ to $C_8$ alkenes, and $C_3$ to $C_8$ aryls, $R^2$ is selected from $C_9$ to $C_{26}$ alkyls, $C_9$ to $C_{26}$ alkenes, and $C_9$ to $C_{26}$ aryls, and $R^3$ is selected from hydrogen, $C_1$ to $C_{26}$ alkyls, $C_2$ to $C_{26}$ alkenes, and $C_3$ to $C_{26}$ aryls. Additionally, in any of the these embodiments, any of the above hydrocarbon substitutions on the nitrogen may be further substituted with $C_1$ to $C_{26}$ alkyl, halogen (bromine or chlorine), sulfoxy (sulfonate or alkyl sulfonate), thiol, alkylthiol, and hydroxyl.

Alternatively, the amine may be a quaternary amine, structurally described as follows:

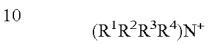

wherein $R^1$, $R^2$, $R^3$, and $R^4$ are the same or different and are independently selected from $C_1$ to $C_{26}$ alkyls, $C_2$ to $C_{26}$ alkenes, and $C_3$ to $C_{26}$ aryls. In one embodiment, $R^1$ and $R^2$ are independently selected from $C_1$ to $C_8$ alkyls, $C_2$ to $C_8$ alkenes, and $C_3$ to $C_8$ aryls, and $R^3$ and $R^4$ are independently selected from $C_9$ to $C_{26}$ alkyls, $C_9$ to $C_{26}$ alkenes, and $C_9$ to $C_{26}$ aryls. In another embodiment, $R^1$ and $R^2$ are independently selected from $C_1$ to $C_8$ alkyls, and $C_2$ to $C_8$ alkenes, $R^3$ is selected from $C_9$ to $C_{26}$ alkyls, and $C_9$ to $C_{26}$ alkenes, and $R^4$ is a $C_3$ to $C_{26}$ aryl substitution on a $C_1$ to $C_{26}$ alkyl. In another embodiment, $R^1$ is selected from $C_1$ to $C_8$ alkyls, $C_2$ to $C_8$ alkenes, and $C_3$ to $C_8$ aryls, $R^2$ is selected from $C_9$ to $C_{26}$ alkyls, $C_9$ to $C_{26}$ alkenes, and $C_9$ to $C_{26}$ aryls, and $R^3$ and $R^4$ are the same or different and are independently selected from $C_1$ to $C_{26}$ alkyls, $C_2$ to $C_{26}$ alkenes, and $C_3$ to $C_{26}$ aryls. Additionally, in any of the these embodiments, any of the above hydrocarbon substitutions on the nitrogen may be further substituted with $C_1$ to $C_{26}$ alkyl, halogen (bromine or chlorine), sulfoxy (sulfonate or alkyl sulfonate), thiol, alkylthiol, and hydroxyl.

Suitable quaternary ammoniums include, but are not limited to, dialkyl di-hydrogenated tallow ammonium, trialkyl hydrogenated tallow ammonium, dimethyl di-hydrogenated tallow ammonium, benzyl trialkyl ammonium, methyl benzyl dialkyl ammonium, methyl benzyl di-hydrogenated tallow ammonium, dimethyl benzyl hydrogenated tallow ammonium, and dibenzyl dialkyl ammonium.

In terms of weight ratios of the modified filler, the modifying agent will comprise 15 to 60 wt % of the modified filler in one embodiment, and will comprise 25 to 45 wt % in another embodiment. In certain embodiments, the exfoliating agent is present in the layered filler within the range from 5 or 10 or 15 or 20 to 40 or 45 or 50 or 55 or 60 wt %, based on the weight of exfoliating agent and clay. Stated as parts per hundred rubber, the exfoliating agent is present in the layered filler within the range of from 0.1 or 0.2 or 0.5 or 1 to 5 or 6 or 7 or 8 phr in the nanocomposite.

Examples of some commercial modified nanoclay products are Cloisites produced by Southern Clay Products, Inc., Gonzales, Tex. For example, Cloisite™ Na⁺, Cloisite™ 30B, Cloisite™ 10A, Cloisite™ 25A, Cloisite™ 93A, Cloisite™ 20A, Cloisite™ 15A, and Cloisite™ 6A. They are also available as SOMASIF and LUCENTITE clays produced by CO-OP Chemical Co., LTD, Tokyo, Japan. For example, SOMASIF™ MAE, SOMASIF™ MEE, SOMASIF™ MPE, SOMASIF™ MTE, SOMASIF™ ME-100, LUCENTITE™ SPN, and LUCENTITE(SWN).

In modifying the clay with the quaternary ammonium, the clay may be modified in such a manner, or post-treated to remove any free ammonium components. In such a treated clay, all of the quaternary salts in the organofiller are associated with negatively charged components on the filler surface—there are no unassociated ammonium salts that could react independently with the elastomer during the mixing of the elastomer and the organoclay. Such organoclays are more fully discussed in Applicant's copending patent application, U.S. application Ser. No. 12/771,775, filed Apr. 30, 2010.

In certain embodiments, treatment of the elastomer with the exfoliating agents described above results in intercalation or "exfoliation" of the layered platelets as a consequence of a reduction of the ionic forces holding the layers together and introduction of molecules between layers which serve to space the layers at distances of greater than 4 Å, alternatively greater than 9 Å. This separation allows the layered silicate to more readily sorb polymerizable monomer material and polymeric material between the layers and facilitates further delamination of the layers when the intercalate is shear mixed with matrix polymer material to provide a uniform dispersion of the exfoliated layers within the polymer matrix.

The amount of exfoliated layered filler incorporated in the nanocomposites in accordance with certain embodiments is sufficient to develop an improvement in the mechanical properties or barrier properties of the nanocomposite, for example, tensile strength, or oxygen permeability. Amounts generally will range from 0.5 to 20 wt % in one embodiment, from 1 to 15 wt % in another embodiment, from 1 to 10 wt % in another embodiment, and from 1 to 5 wt % in another embodiment, based on the polymer content of the nanocomposite. Expressed in parts per hundred rubber, the exfoliated layered filler is present in the nanocomposite within the range from 4 or 5 phr to 6 or 7 or 8 or 10 or 15 phr.

Nanocomposite Preparation

In accordance with the present invention, the nanocomposite is prepared under solution mixing conditions. The elastomeric polymer is dissolved in a solvent, creating a cement. While the elastomer may be dissolved in the solvent after first being fully prepared, i.e., polymerized and dried, it is preferred that the formation of the nanocomposite occur as a step in the original manufacturing process to form the elastomeric polymer as the process to dry and package the polymer may negatively affect the desired impermeability characteristics of the nanocomposite.

Suitable solvents for dissolving the polymer include hydrocarbons such as alkanes, including $C_4$ to $C_{22}$ linear, cyclic, branched alkanes, alkenes, aromatics, and mixtures thereof. Examples include propane, isobutane, pentane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcycopentane, c is 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and mixtures thereof.

In another embodiment, suitable solvents include one or more nitrated alkanes, including $C_2$ to $C_{22}$ nitrated linear, cyclic, or branched alkanes. Nitrated alkanes include, but are not limited to nitromethane, nitroethane, nitropropane, nitrobutane, nitropentane, nitrohexane, nitroheptane, nitrooctane, nitrodecane, nitrononane, nitrododecane, nitroundecane, nitrocyclomethane, nitrocycloethane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above, and mixtures thereof.

In another embodiment, suitable solvents include at least one oxygenate, including $C_1$ to $C_{22}$ alcohols, ketones, ethers, carboxylic acids, esters, and mixtures thereof. Other suitable solvents are further described in WO 2006/085957.

Halogenated versions of all of the above may also be used such as chlorinated hydrocarbons, for example, methyl chloride, methylene chloride, ethyl chloride, propyl chloride, butyl chloride, chloroform, and mixtures thereof.

The necessary characteristic of the solvent is that it be capable of dissolving, and actually dissolve, the polymer at the temperature at which the polymer is to be mixed with the nanofiller. For some certain solvents, at polymerization temperatures the polymer might not be dissolvable in the solvent, but yet the liquid becomes a solvent for the polymer at different temperatures at which the polymer will be mixed with the nanofiller. For such dual use diluent/solvents, following slurry polymerizations, the temperature of the slurry may be raised to dissolve the polymer and solvent replacement might not be necessary.

Prior to introduction to the dissolved polymer, the nanofiller may also be added to a hydrocarbon liquid to produce a nanofiller slurry. Any of the above listed solvents are suitable and may be used for preparing the nanofiller slurry. The solvent is ideally selected to avoid any reactions of the solvent with the nanofiller modifying agent. Mixing of the nanofiller in the solvent may further initiate separation of the filler plates. In an embodiment, the slurry is prepared so as to have a nanofiller content of anywhere in the range of 5 to 65 wt % clay, with a preferred filler loading of 10 to 50 wt %. While the slurry may have a higher filler loading, up to 85 wt %, such higher loadings are not preferred as the filler may not become sufficiently 'wet' prior to introduction to the polymer cement. If necessary, not more than 5 wt %, preferably not more than 3 wt %, water may be added to the filler slurry to provide slip to the filler; this may be more beneficial when the nanofiller is a hydrophilic layered clay versus other less hydrophilic layered fillers.

The solvent used to prepare the polymer cement and the nanofiller slurry may be the same or may be different. Also a mixture of solvents may be used to dissolve the polymer and/or create the filler slurry. Based upon the desired nanofiller loading of the polymer and the filler loading of the filler slurry, in the mixture of solvents when two or more solvents are prepared in the production of the nanocomposite composition, each solvent may comprise from 0.1 to 99.9 vol %, alternatively from 1 to 99 vol %, alternatively from 5 to 95 vol %, and alternatively from 10 to 90 vol %, with the total volume of all solvents present at 100 vol %.

Figure 2:
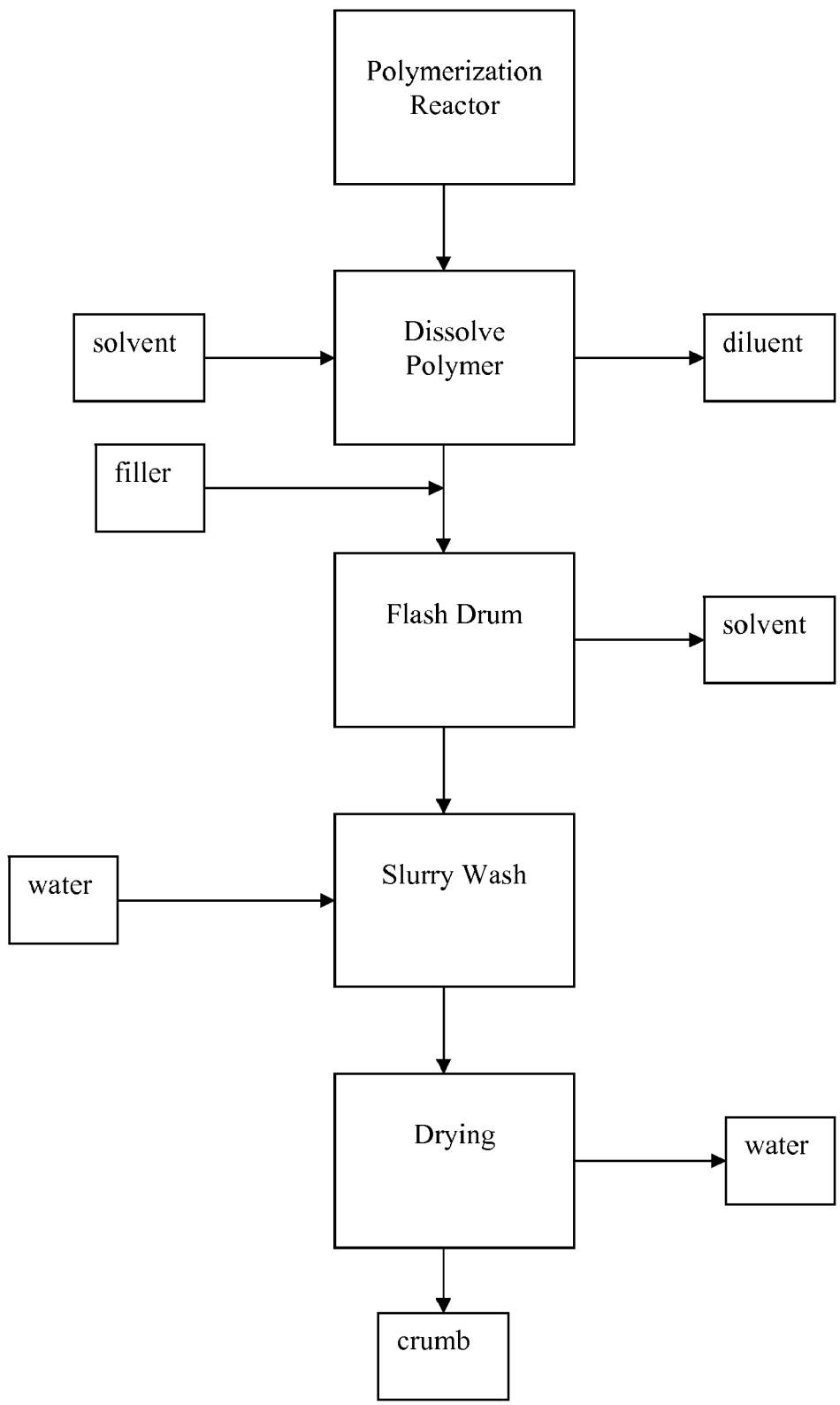
FIG. 2 is a diagram for manufacturing a nanocomposite polymer based upon slurry polymerization for the base polymer.

As stated, in accordance with an embodiment of the invention, the nanocomposite is formed during the manufacturing process of the elastomeric polymer, preferably during the manufacturing process of the isobutylene based polymer, whether the isobutylene based polymer is a butyl rubber, halogenated butyl rubber, a random isobutylene-styrene polymer, or a halogenated random isobutylene-styrene polymer. Formation of butyl elastomers is well known to those skilled in the art, and is described in detail in, for example, U.S. Pat. No. 2,356,128; U.S. Pat. No. 4,474,924; U.S. Pat. No. 4,068,051; and U.S. Pat. No. 7,414,101. As disclosed in these references, the monomers and catalysts are dissolved in a solvent, in which the polymerization occurs. If the polymerization is a slurry polymerization, the solvent is selected such that the resulting polymer will precipitate out of the solvent upon formation. Slurry polymerization conditions result in 10 to 70 wt % solids in the slurry. Following polymerization, for both solution polymerization and slurry polymerization, the polymer must be recovered from the solvent. This is typically done in a flash drum, followed by washing and drying of the polymer to yield a rubber crumb suitable for baling and package, see FIGS. 1 and 2.

Figure 3:
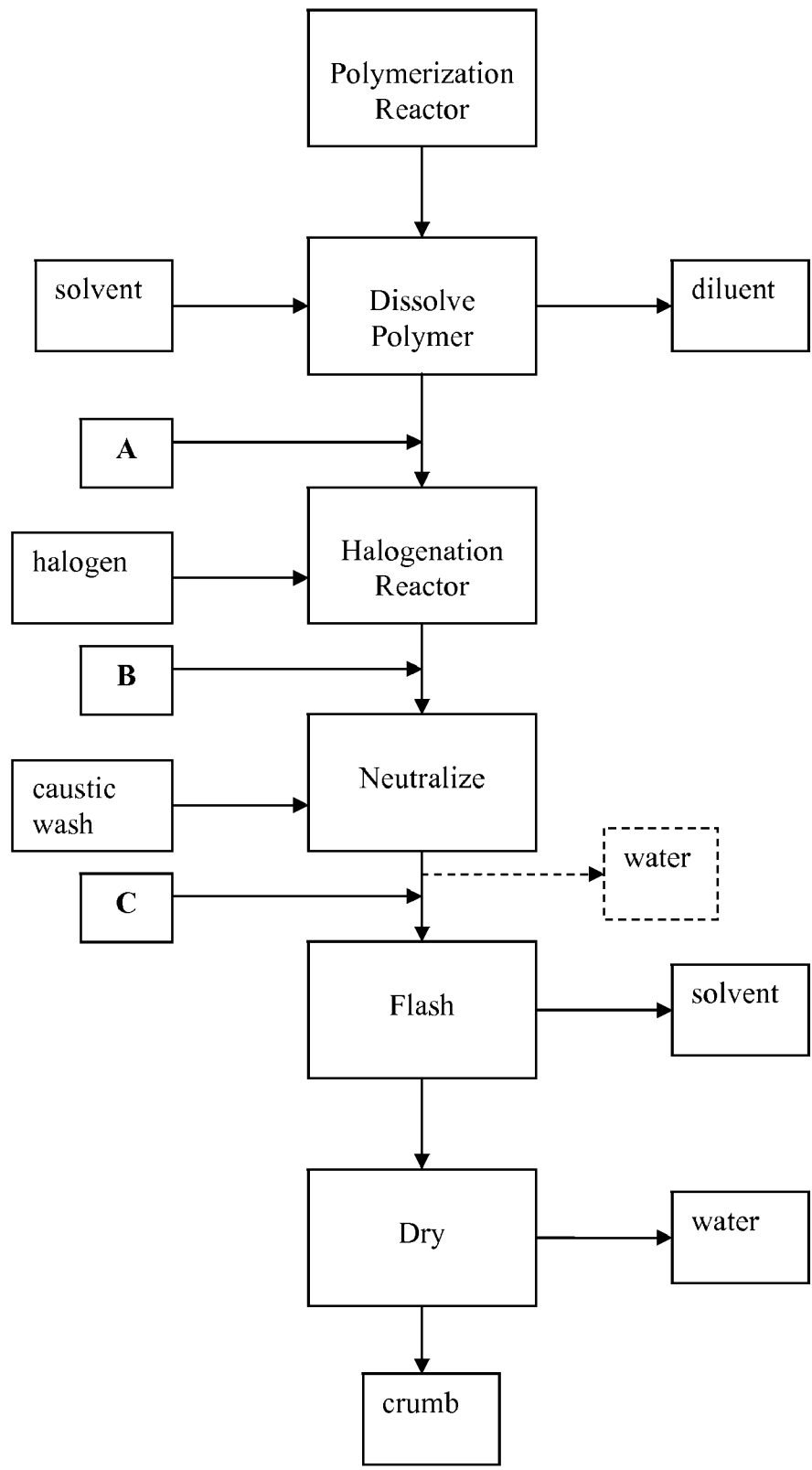
FIG. 3 is a diagram of the manufacturing process for a halogenated nanocomposite polymer.

If the butyl is to be halogenated, for polymer that has not yet been finished and was prepared via slurry polymerization, the slurry is treated to remove any remaining unreacted monomers and the diluent is replaced with a hydrocarbon to dissolve the polymer, see FIG. 3. If the polymer is prepared via solution mixture and is still in suspension, if necessary the solvent may be switched, and the polymer cement is treated to remove any remaining unreacted monomers. For halogenated butyl polymers, the solvent should be essentially free of unreacted monomers or low molecular weight side species may form during halogenation. Such species can negatively affect the desired end properties of the final halogenated polymer.

Halogenation of the dissolved polymer is carried out by adding bromine liquid or chlorine vapor to the polymer solution. Halogenation of isobutylene copolymers is also described in U.S. Pat. No. 5,670,582. After halogenation, the solution is subjected to a neutralization step wherein the by-product of the halogenation, HBr or HCl, is conventionally reacted with an aqueous caustic solution to yield a soluble salt in an aqueous phase that is later removed.

For both the halogenated and non-halogenated polymer, the butyl polymer is then finished by removal of all solvents and drying of the polymer into a crumb form that may be baled or packaged.

Per the present invention, after the chemistry/physical structure of the base polymer itself is fixed or established and while the polymer is dissolved in a solvent, the nanofiller is introduced to the polymer. The nanofiller is added after at least one mass transfer dependent stage in manufacturing of the final polymer structure has been completed but prior to any recovery of the polymer wherein recovery of the polymer is defined by isolation and/or removal of the polymer from any diluent or solvent and which may or may not include drying of the polymer. For the purpose of this invention, a mass transfer dependent stage is any stage in the manufacturing of the polymer that involves molecular transport of atoms and/or molecules within the physical system. For non-halogenated elastomers, the nanofiller is added after polymerization but before solvent removal and drying of the polymer, see FIGS. 1 and 2. For halogenated elastomers, the additional steps required to halogenate the polymer, i.e. additional mass transfer dependent stages, provide for additional entry points for the nanofiller in the process, see FIG. 3. The nanofiller may also be added before halogenation—point A, after halogenation and before neutralization—point B, or after neutralization—point C.

The nanofiller may be added after halogenation to avoid any halogenation of the nanofiller modifier. If any free or excess bromine or chlorine bonds with the modifying agent on the nanofiller, the filler may be rendered less hydrophobic and less compatible with the polymer. With reduced compatibility, downstream processing of the polymer (either during the remainder of the nanocomposite process or during elastomeric compounding with the nanocomposite) may result in the dispersed or exfoliated nanofiller layers agglomerating and reducing the dispersed nature of the clay. This would result in reduced impermeability characteristics of the nanocomposite.

The nanofiller may also be added after neutralization following halogenation to prevent any interference with the neutralization step and to permit any free or excess halogen to be eliminated and avoid any bonding with the nanofiller modifying agent.

To effect complete contacting of the layered nanofiller and the polymer dissolved in the solvent; the combined liquids (the nanofiller slurry and the polymer cement) may be subjected to mixing. The mixing may be that which the fluids experience by passing through the pipes between the different tanks in the system, static mixing in a tank, or high shear mixing achieved by a high speed mixing blade in a tank.

To demonstrate the effects of adding the nanofiller post-halogenation/neutralization process steps, the following tests were performed.

Test 1

An HBr diffusion test was performed via the following set up. A sight glass was mounted in a hood. A fixed volume of aqueous phase containing sodium hydroxide and a pH indicator was placed in the sight glass. A fixed volume of polymer cement is added. The polymer cement used was brominated isobutylene para-methylstyrene (BIMSM) in hexane. For the comparative test, the cement did not contain a nanofiller; for the example test, the cement contained 10 phr nanoclay (Cloisite™ 20A from Southern Clay Products—clay with a dimethyl di-hydrogenated ammonium modifier). The container was then pressurized with HBr gas to provide a molar excess of HBr versus NaOH. No agitation was provided. Over time, HBr dissolved in the cement phase and then diffused to the aqueous phase where it rapidly reacted with the sodium hydroxide. The rate of dissolving/diffusion was measured by the rate at which the color changed—from pink to clear—in the aqueous phase. The test parameters and results are shown below in Table 1.

TABLE 1

| Test Parameters | Example | Comparative |
| --- | --- | --- |
| Aqueous phase volume (ml) | 150 | 150 |
| Sodium hydroxide conc. (N) | 0.01 | 0.01 |
| Cement volume (ml) | 10 | 10 |
| BIMSM concentration in cement (wt %) | 15.3 | 15.3 |
| Nanoclay concentration in cement (wt %) | 1.5 | 0 |
| HBr gas pressure (psig) | 42 | 42 |
| Time for pH indicator color change (min.) | >60 | 22 |

For the comparative test, the color changed in 22 minutes. For the example test containing the nanoclay, it took longer than 60 minutes for any observable color change. This suggests that presence of the organoclay may interfere with the neutralization process of the cement.

Test 2

A second diffusion test was performed, this time including agitation of the cement. A 1.5 liter glass continuous stirred-tank reactor (CSTR) was charged with aqueous sodium hydroxide and a pH indicator. For two trials, the tank was charged with a hexane polymer cement and for one run, the tank was charged with hexane alone. The vapor space was pressurized with HBr gas to provide a molar excess of HBr versus NaOH. The CSTR agitator was turned on and the time required for the pH indicator in the aqueous phase to change color was noted. The results are set forth below in Table 2. As each trial was performed twice, the average results are provided.

TABLE 2

| Test Parameters | Example | Comparative 1 | Comparative 2 |
| --- | --- | --- | --- |
| Number of trials | 2 | 2 | 2 |
| Aqueous phase volume (ml) | 200 | 200 | 200 |
| Sodium hydroxide conc. (N) | 0.071 | 0.071 | 0.071 |

TABLE 2-continued

| Test Parameters | Example | Comparative 1 | Comparative 2 |
|---|---|---|---|
| Cement volume (ml) | 800 | 800 | 800 |
| BIMSM concentration in cement (wt %) | 14.6 | 17.2 | 0 |
| Nanoclay concentration in cement (wt %) | 1.5 | 0 | 0 |
| Initial HBr gas pressure (psig) | 30 | 30 | 30 |
| Impeller speed (rpm) | 400 | 400 | 400 |
| Time for pH indicator color change (min.) | 30.3 | 2.7 | 0.1 |

The hexane-alone run, comparative 2, shows a rapid drop in the aqueous phase pH. For comparative 1, the pH change occurred within several minutes. As seen when comparing Test 1 and Test 2, the pH change occurred significantly faster when agitation was provided; however, the delay in the pH change suggests the nanoclay may interfere with both halogenation and subsequent neutralization of the cement.

As noted above, when preparing a halogenated nanocomposite, the halogenated polymer cement is neutralized by means of a caustic wash. This introduces water into the solvent based system. The water may be completely or partially removed from the system prior to introduction of the nanofiller slurry. If the water is not completely removed, if the remaining water is greater than 5 wt % of the total mixture of solvents, polymer, and nanofiller, an emulsifier, or surfactant may be used to obtain an emulsion of the system to permit the polymer and nanofiller to interact and preclude the water from rendering the nanofiller more hydrophilic and reduce the compatibility with the polymer.

The system is subjected to sufficient shearing, as in a commercial blender or its equivalent, for a period of time sufficient for forming the emulsion, e.g., generally at least a few seconds. The emulsion can be allowed to remain in emulsion form, with or without continuous or intermittent mixing or agitation, with or without heating or other temperature control, for a period sufficient to enhance exfoliation of the clay, from 0.1 to 100 hours or more in one embodiment, from 1 to 50 hours in another embodiment, and from 2 to 20 hours in another embodiment.

When used, the surfactant concentration is sufficient to allow the formation of a relatively stable emulsion. Preferably, the amount of surfactant employed is at least 0.001 weight percent of the total emulsion, more preferably about 0.001 to about 3 weight percent, and most preferably 0.01 to less than 2 weight percent.

Cationic surfactants useful in preparing the emulsions of this invention include tertiary amines, diamines, polyamines, amines, as well as quaternary ammonium compounds. Nonionic surfactants useful in preparing the emulsions of this invention include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates.

After the nanofiller has been incorporated into the polymer, using conventional elastomeric drying methods, the elastomeric nanocomposite is recovered from the solvent mixture. After the elastomeric nanocomposite is recovered, it may then be compounded with traditional elastomeric compounding constituents to form a fully compounded elastomeric composition.

The elastomeric nanocomposite may be present in an elastomeric composition in a range from up to 90 phr in one embodiment, from up to 50 phr in another embodiment, from up to 40 phr in another embodiment, and from up to 30 phr in yet another embodiment. When used as the primary elastomer in a composition for use as an air impervious layer in an article, such as a tire innerliner, tire innertube, or a hose layer, the nanocomposite will comprise 80 to 100 phr of the elastomer present in the composition.

Secondary elastomers that may be blended with the elastomeric nanocomposite may include elastomers comprising the same polymers as used in forming the nanocomposite. Alternatively, suitable secondary elastomers can be other conventional thermoelastic polymers consistent with the ASTM D1566 definition: "a material that is capable of recovering from large deformations, and can be, or already is, modified to a state in which it is essentially insoluble (but can swell) in boiling solvent . . . ." Some examples of such secondary rubbers includes, but is not limited to, natural rubbers (NR), polyisoprene rubber (IR), poly(styrene-co-butadiene) rubber (SBR), polybutadiene rubber (BR), poly(isoprene-co-butadiene) rubber (IBR), and styrene-isoprene-butadiene rubber (SIBR), and mixtures thereof. Ethylene-propylene rubber (EPM) and ethylene-propylene-diene rubber (EPDM).

In another embodiment, the elastomeric nanocomposite may be blended with at least one thermoplastic resin. Thermoplastic resins may be used singly or in combination and are resins containing nitrogen, oxygen, halogen, sulfur or other groups capable of interacting with an aromatic functional groups such as halogen or acidic groups. The elastomeric nanocomposite and thermoplastic resin are combined under conditions such that the resulting composition is a dynamically vulcanized alloy. Preferably, the thermoplastic resin forms a continuous domain in the material while the elastomeric nanocomposite is present as discrete elements in the thermoplastic resin domain. The resulting alloy has the repeatable processability of thermoplastic with the flexibility of the elastomer. The thermoplastic resins are present in the nanocomposite comprising alloy in amounts from 40 to 80 wt % in one embodiment, and from 50 to 70 wt % in yet another embodiment.

Suitable thermoplastic resins include resins selected from the group consisting or polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

The elastomeric nanocomposite may also be blended with a variety of other components and may be optionally cured to form cured elastomeric nanocomposite compositions that ultimately are fabricated into end use articles. For example, the elastomeric compositions may optionally comprise: a) at least one filler having a size larger than the nanofiller of the present invention, such as calcium carbonate, silica, talc, titanium dioxide, starch, wood flour, carbon black, or mixtures thereof; b) at least one processing oil intended to adjust the Mooney viscosity of the compound during mixing and processing of the compound, for example, aromatic oil, naphthenic oil, paraffinic oil, or mixtures thereof; c) at least one processing aid which is also used to adjust the processing properties of the elastomeric nanocomposite, for example, plastomer, polybutene, polyalphaolefin oils, or mixtures thereof; d) at least one cure package or curative or wherein the composition has undergone at least one process to produce a cured composition; and e) any combination of a-f.

The invention, accordingly, provides the following embodiments:

A. A method for producing an elastomeric nanocomposite, the nanocomposite comprising an isobutylene-based polymer and a layered nanofiller, the process comprising the steps of a) polymerizing isobutylene monomers and multiolefin monomers to produce an isobutylene-based polymer; b) completing at least one mass transfer dependent stage in the process wherein after completion of the stage and prior to recovery of the polymer, the polymer is dissolved in a solvent; c) contacting the layered nanofiller and the polymer solvent to obtain the nanocomposite; and d) recovering the nanocomposite.

B. The method of embodiment A, wherein the completed at least one mass transfer dependent stage is: i) the polymerization of the isobutylene monomers and multiolefin monomers; ii) functionalized of the isobutylene-based polymer in a solvent; or iii) neutralization of the functionalized isobutylene-based polymer solvent.

C. The method of embodiment B wherein at least stages i) and ii) are completed prior to contacting the nanofiller slurry and the polymer solvent.

D. The method of embodiment B wherein stages i), ii), and iii) are completed prior to contacting the nanofiller slurry and the polymer solvent.

E. The method of any one of embodiments A to D wherein functionalization of the isobutylene-based polymer yields a halogenated isobutylene-based polymer.

F The method of any one of embodiments A to E wherein multiolefin monomers are $C_4$ to $C_{14}$ multiolefins.

G. The method of embodiment F wherein the multiolefin monomer is at least one of isoprene, butadiene, 2,3-dimethyl-1,3-butadiene, myrcene, 6,6-dimethyl-fulvene, hexadiene, cyclopentadiene, alkylstyrene, or piperylene.

H. The method of any one of embodiments A to G or any combination of embodiments A to G wherein the isobutylene based polymer is butyl rubber, bromobutyl rubber, chlorobutyl rubber, brominated isobutylene-methyl-styrene rubber, chlorinated isobutylene-methyl-styrene rubber, star branched butyl rubber, star branched chlorobutyl rubber, star branched bromobutyl rubber, isoprene-isobutylene-methyl-styrene rubber, or isobutylene-cyclopentadiene-methylsytrene rubber.

I. The method of any one of embodiments A to H or any combination of embodiments A to H wherein the layered nanofiller is smectite or phyllosilicate clay.

J. The method of any one of embodiments A to I or any combination of embodiments A to I wherein the layered nanofiller is montmorillonite, beidellite, nontronite, saponite, hectorite, sauconite, montmorillonite, nontronite, beidellite, bentonite, volkonskoite, laponite, hectorite, saponite, sauconite, magadite, kenyaite, stevensite, vermiculite, halloysite, aluminate oxides, or hydrotalcite.

K. The method of any one of embodiments A to J or any combination of embodiments A to J wherein the layered nanofiller has been treated with a modifying agent prior to contacting with the polymer solvent.

L. The method of any one of embodiments A to K or any combination of embodiments A to K wherein, prior to contacting the layered nanofiller with the polymer solvent, the layered nanofiller is mixed in a solvent to create a filler slurry.

M. The method of any one of embodiments A to L or any combination of embodiments A to L wherein the contacting of the layered nanofiller and polymer solvent includes mixing of the nanofiller and polymer solvent.

N. The method of embodiment M wherein the mixing is high shear mixing or static mixing.

O. The method of any one of embodiments A to N or any combination of embodiments A to N wherein an emulsifier is added during the contacting step.

P. The method of any one of embodiments A to O or any combination of embodiments A to O wherein the time for the contacting step is less than 60 minutes.

Q. The method of any one of embodiments A to P or any combination of embodiments A to P wherein the time for the contacting step is less than 30 minutes.

R. The method of any one of embodiments A to Q or any combination of embodiments A to Q wherein the step of recovering the nanocomposite includes at least of the following steps removal of the solvent, washing the nanocomposite, drying the nanocomposite, and baling the nanocomposite.

S. The method of any one of embodiments A to R or any combination of embodiments A to R wherein the nanocomposite is compounded with thermoplastic resins.

T. The method of any one of embodiments A to S or any combination of embodiments A to S wherein the elastomeric nanocomposite is further blended into an elastomeric composition and is present in the elastomeric composition in amounts of 80 to 100 phr.

U. The method of any one of embodiments A to T or any combination of embodiments A to T wherein the elastomeric nanocomposite is further blended with any one or more of the following elastomeric constituents: non-nanocomposite fillers such as carbon black or silica, processing oils, processing aids, and curatives.

V. The method of any one of embodiments A to U or any combination of embodiments A to U wherein the elastomeric nanocomposite is compounded and used to form a tire innerliner, a tire inner tube, an air bladder, or a hose layer.

W. The method of any one of embodiments A to V or any combination of embodiments A to V wherein the monomers are polymerized in a solvent, creating a polymer cement, so that the nanofiller is directly added to the polymer cement prior to any recovery of the polymer.

Compositions comprising the nanocomposites of the invention may be extruded, compression molded, blow molded, injection molded, and laminated into various shaped articles including fibers, films, laminates, layers, industrial parts such as automotive parts, appliance housings, consumer products, packaging, and the like.

The nanocomposite compositions as described above may be used in the manufacture of air membranes such as innerliners, innertubes sidewalls, treads, bladders, and the like used in the production of tires. Methods and equipment used to manufacture the innerliners and tires are well known in the art. The invention is not limited to any particular method of manufacture for articles such as innerliners or tires. In particular, the nanocomposites are useful in compositions used in articles for a variety of tire applications such as truck tires, bus tires, automobile tires, motorcycle tires, off-road tires, aircraft tires, and the like.

In another application, elastomeric compositions comprising the nanocomposite may be employed in air cushions, pneumatic springs, air bellows, hoses, accumulator bags, and belts such as conveyor belts or automotive belts. They are useful in molded rubber parts and find wide applications in automobile suspension bumpers, auto exhaust hangers, and body mounts.

Additionally, elastomeric compositions comprising the nanocomposite may also be used as adhesives, caulks, sealants, and glazing compounds. They are also useful as plasticizers in rubber formulations; as components to compositions that are manufactured into stretch-wrap films; as dispersants for lubricants; and in potting and electrical cable filling materials.

All priority documents, patents, publications, and patent applications, test procedures (such as ASTM methods), and other documents cited herein are fully incorporated by reference to the extent such disclosure is not inconsistent with this invention and for all jurisdictions in which such incorporation is permitted. When numerical lower limits and numerical upper limits are listed herein, ranges from any lower limit to any upper limit are contemplated.

What is claimed is:

1. A method for producing an elastomeric nanocomposite, the nanocomposite comprising an isobutylene-based polymer and a layered nanofiller, the process comprising the steps of:
   a) polymerizing isobutylene monomers and multiolefin monomers to produce an isobutylene-based polymer;
   b) completing at least one mass transfer dependent stage in the process wherein, after completion of the at least one stage and prior to any recovery of the polymer, the polymer is dissolved in a solvent;
   c) mixing a layered nanofiller in a solvent to create a nanofiller slurry, the filler slurry having not more than 5 wt % water;
   d) contacting the layered nanofiller slurry and the polymer solvent to obtain a nanocomposite; and
   e) recovering the nanocomposite.

2. The method of claim 1, wherein the completed at least one mass transfer dependent stage is: i) the polymerization of the isobutylene monomers and multiolefin monomers; ii) functionalized of the isobutylene-based polymer in a solvent; or iii) neutralization of the functionalized isobutylene-based polymer solvent.

3. The method of claim 2, wherein stages i) and ii) are completed prior to contacting the nanofiller slurry and the polymer solvent.

4. The method of claim 2, wherein all stages i), ii), and iii) are completed prior to contacting the nanofiller slurry and the polymer solvent.

5. The method of claim 2, wherein functionalization of the isobutylene-based polymer halogenates the polymer.

6. The method of claim 1, wherein multiolefin monomers are $C_4$ to $C_{14}$ multiolefins.

7. The method of claim 6, wherein the multiolefin monomer is at least one of isoprene, butadiene, 2,3-dimethyl-1,3-butadiene, myrcene, 6,6-dimethyl-fulvene, hexadiene, cyclopentadiene, alkylstyrene, or piperylene.

8. The method of claim 1, wherein the isobutylene based polymer is butyl rubber, bromobutyl rubber, chlorobutyl rubber, brominated isobutylene-methyl-styrene rubber, chlorinated isobutylene-methyl-styrene rubber, star branched butyl rubber, star branched chlorobutyl rubber, star branched bromobutyl rubber, isoprene-isobutylene-methyl-styrene rubber, or isobutylene-cyclopentadiene-methylsytrene rubber.

9. The method of claim 1, wherein the layered nanofiller is smectite or phyllosilicate clay.

10. The method of claim 1, wherein the layered nanofiller is montmorillonite, beidellite, nontronite, saponite, hectorite, sauconite, montmorillonite, nontronite, beidellite, bentonite, volkonskoite, laponite, hectorite, saponite, sauconite, magadite, kenyaite, stevensite, vermiculite, halloysite, aluminate oxides, or hydrotalcite.

11. The method of claim 1, wherein the layered nanofiller has been treated with a modifying agent prior to contacting with the polymer solvent.

12. The method of claim 1, wherein the contacting of the layered nanofiller slurry and polymer solvent includes mixing of the nanofiller slurry and polymer solvent.

13. The method of claim 12, wherein the mixing is high shear mixing or static mixing.

14. The method of claim 1, wherein an emulsifier is added during the contacting step.

15. The method of claim 1, wherein the time for the contacting step is less than 60 minutes.

16. The method of claim 1, wherein the time for the contacting step is less than 30 minutes.

17. The method of claim 1, wherein the step of recovering the nanocomposite includes at least of the following steps removal of the solvent, washing the nanocomposite, drying the nanocomposite, and baling the nanocomposite.

18. The method of claim 1, wherein the monomers are polymerized in the solvent.

19. The method of claim 1, wherein the layered nanofiller, prior to the mixing of step c) is modified with at least one agent, modifier, or surfactant.

* * * * *